March 3, 1936.  C. W. NEWHALL, JR., ET AL  2,032,494
CABLE TESTING DEVICE
Filed Aug. 2, 1933   4 Sheets-Sheet 1

Inventors:
Charles W. Newhall Jr.
Ted B. Morse
By Brown Jackson Boettcher Dienner
Attys

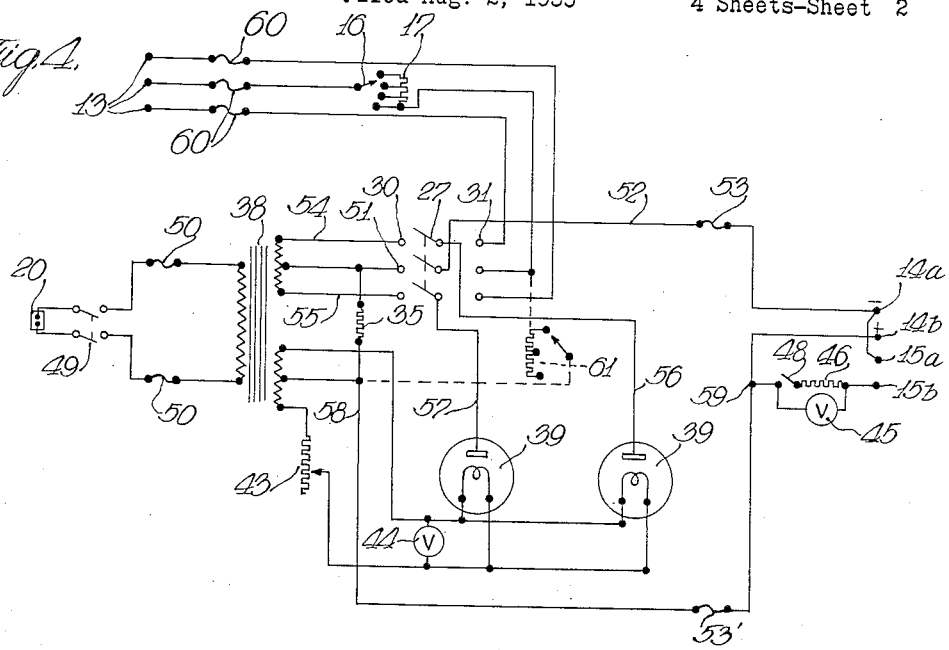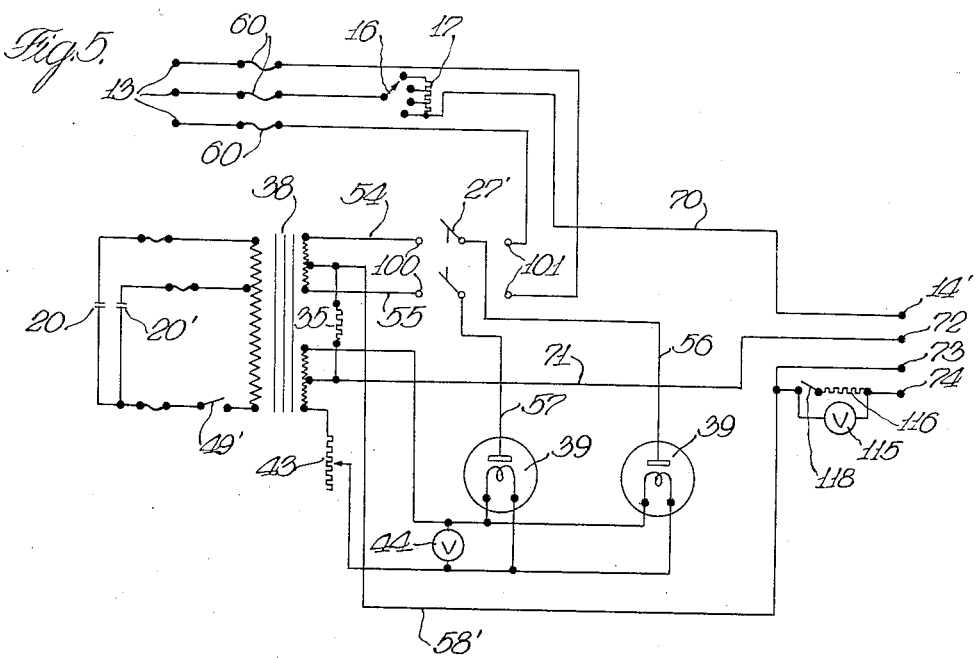

March 3, 1936.  C. W. NEWHALL, JR., ET AL  2,032,494
CABLE TESTING DEVICE
Filed Aug. 2, 1933  4 Sheets-Sheet 3
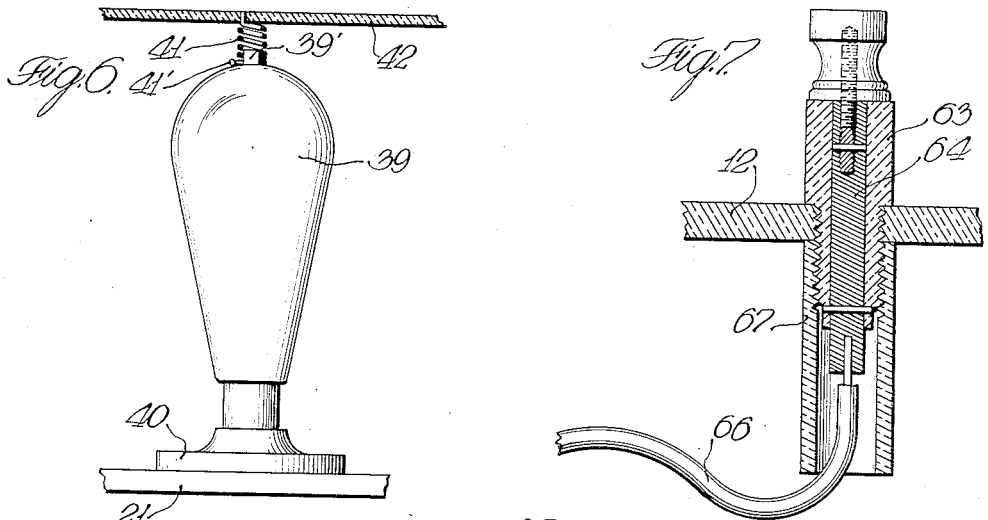
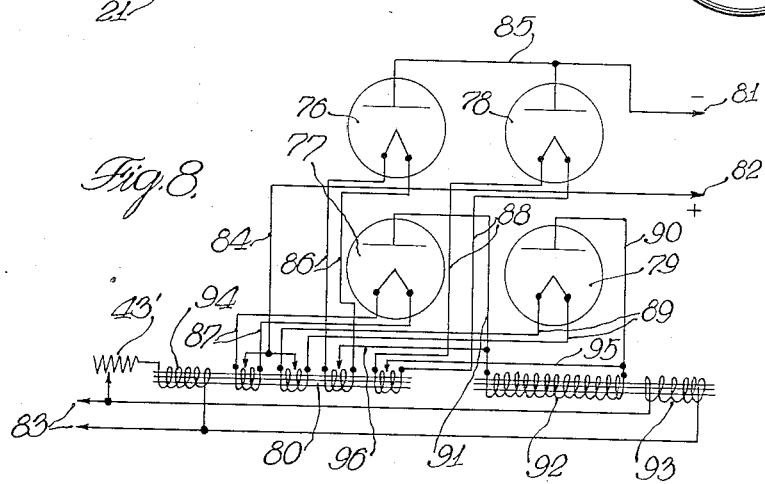
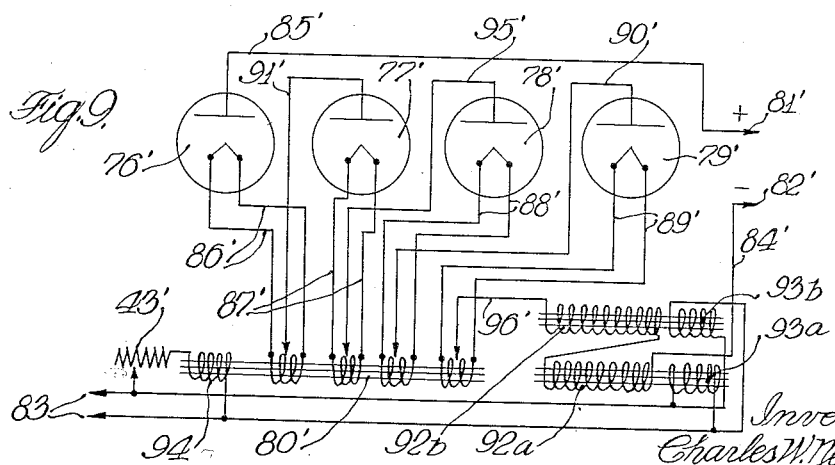
Inventors:
Charles W. Newhall Jr.
Ted B. Morse
By Mason Jackson Boettcher Dewey
Attys March 3, 1936.  C. W. NEWHALL, JR., ET AL  2,032,494
CABLE TESTING DEVICE
Filed Aug. 2, 1933   4 Sheets-Sheet 4
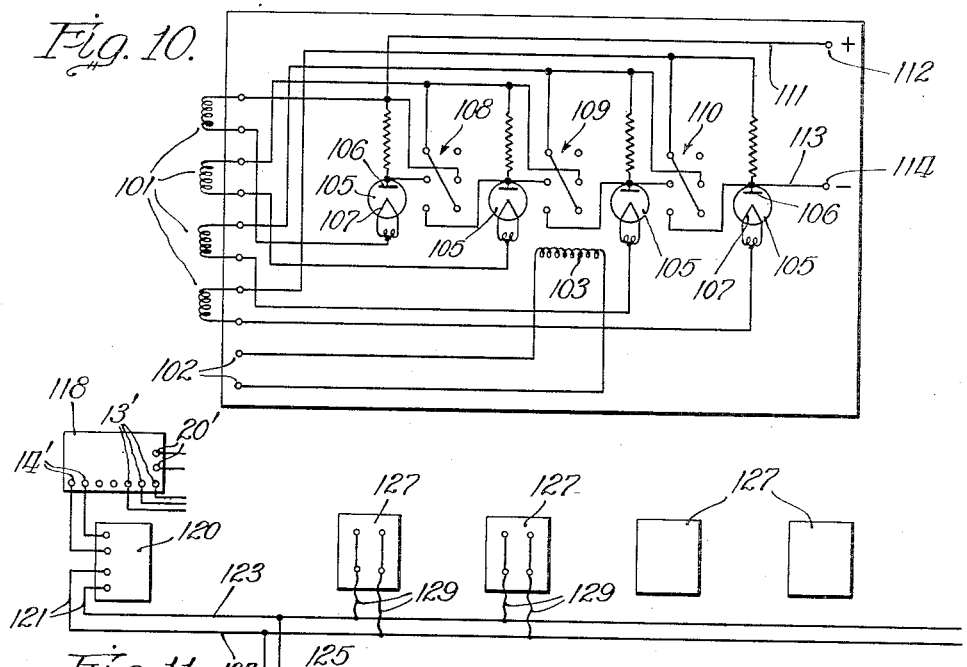
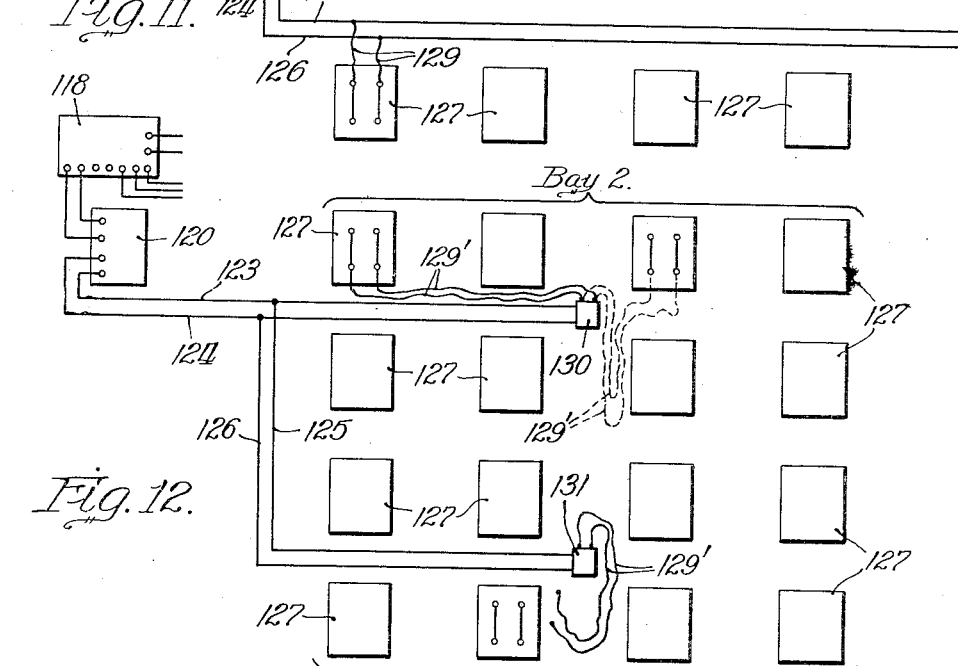
Inventors:
Charles W. Newhall, Jr.
Ted B. Morse
By: Mason, Jackson, Boettcher, Dienner
Att'ys.

Patented Mar. 3, 1936

2,032,494

UNITED STATES PATENT OFFICE 2,032,494

CABLE TESTING DEVICE

Charles W. Newhall, Jr., Evanston, and Ted B. Morse, Chicago, Ill.

Application August 2, 1933, Serial No. 683,266

7 Claims. (Cl. 175—363)

This invention relates to testing devices, and more particularly to insulated conductor testing devices for analyzing and localizing faults in an insulated conductor, whether it be a high tension or overhead transmission line, an underground cable, or other lines involving insulated conductors or their equivalents, hereinafter referred to generically as cables.

The present invention is a continuation in part of our copending application, Serial No. 635,580, filed September 30, 1932, and is directed more particularly to the direct current supply set and low tension testing circuit which is used in connection with the analysis and location of faults in cables where an electrical circuit may be completed through the faulted conductor and an unfaulted conductor, or through a faulted conductor and another conductor having a different degree of fault resistance than the faulted conductor.

The preferred embodiment of our invention is directed to a direct current supply set which may be employed in combination with a Murray loop for analyzing and locating cable faults. The direct current supply set and low tension testing circuit disclosed herein is adapted to increase the range of application of such a testing means to the location of cable faults, since in most cases the direct current supplied by the set is capable of maintaining current flow through the fault regardless of its resistance, which eliminates the necessity of burning the fault through to ground before the loop measurements are made. This increase in scope of the present direct current supply set is effected by the use of mercury vapor rectifying tubes mounted within the set and capable of delivering a high direct current voltage to the Murray loop, the source of supply being from any general alternating current voltage. The combination of a direct current supply set using mercury vapor rectifying tubes with a Murray loop circuit, is, we believe, broadly new.

In carrying out our invention, we have provided a compact direct current supply set and low tension testing circuit disposed within a portable casing, the set being provided with means for facilitating connection to any of the general alternating current supply sources, such as the ordinary 110 volt supply source, or, for higher voltages, a high tension alternating current supply line, or the like. The mounting of the instruments and devices comprising the set is such as to protect them from injuries due to vibration, shock, or the like when transported about, or while being used in the field. The instrument box may contain also suitable supply leads, control rods and insulating members, conforming to code or safety requirements, which can be transported with the set. The portability of the set allows its use at any desired point. The mercury vapor rectifying tubes are specially mounted to prevent them from being injured during transportation of the set.

In the operation of the apparatus, the low tension testing circuit is first connected to the conductor which is faulted, and has its one side grounded to complete a circuit to the grounded fault. The testing circuit will then determine the approximate resistance of the fault. From this, the magnitude of the voltage necessary to pass a current through the fault can be determined. A jumper is then connected between a clear conductor and the faulted conductor at the far ends, and the terminal ends of these conductors are connected to the terminals of the Wheatstone bridge circuit, which is described in more detail in our copending application. The known resistances of the bridge circuit are then varied, and thus the exact resistance of the conductor is determined and, if there are any breaks in the conductors, these will show up. This may be roughly checked in advance by use of the low tension testing set.

Any direct current source up to the limiting insulating value of the cable line may be used, and for low and medium to medium high resistance faults, the direct current supply set, which in this embodiment of the invention will supply a voltage up to the limiting value of the tubes, may be used. The limiting insulation of the Murray loop used for accurately locating the fault after the preliminary tests have been made with the low tension testing circuit, is, in the embodiment of our invention disclosed in our copending application, about 100,000 volts direct current, but it is to be understood that this may be increased without departing from the scope of the present invention, and we have therefore shown, in the present application, means for increasing the voltage output of the direct current supply set.

The feature of providing a testing and localizing set which is capable of universal application of voltages, with either a direct or alternating current source of supply, up to the limiting insulating value of the loop, is, we believe, broadly new. The set is adapted for use with any of the generally used voltages which may be available. Universality of voltage application enables the analysis and location of faults in which two continuous electrical paths, one being the faulted conductor, and the other being either a clear conductor or a conductor having a fault of different resistance at the same point, are available.

In carrying out the invention, the loop which is used with the direct current supply set to be described is designed for any voltage up to the limiting insulating value of the line without requiring change of connection. In so designing the set, it is apparent that the use of the apparatus is practically universal for fault location purposes. It is so designed that any voltage necessary to establish and maintain a current through the fault sufficient to make the necessary measurements, which will be below the limiting insulating value of the set, may be used directly on the instrument. A voltage of sufficient magnitude to cover a large majority of the cases is supplied by the direct current supply set to be described more fully hereinafter. An intermittent arc at the fault will not cause an appreciable inaccuracy in the results. This is due to the special design of the instrument.

The use of small mercury vapor rectifying tubes in the direct current supply set is distinctly advantageous, because of their high current passing characteristics, and the uniform voltage-drop over the entire voltage range, and also because of their compactness, efficiency and replaceability. These tubes operate satisfactorily at any voltage up to the limiting value of the tubes, and are capable of efficient control for regulating and supplying the current to the low tension testing equipment and as a course of low voltage direct current supply to the loop and bridge circuits. Throughout the alternating current voltage range, these tubes will pass their rated current. The use of this type of rectifying means in connection with a loop circuit, is, we believe, broadly new. They are capable of rectifying any alternating current supply up to the limiting direct current output voltage of the tubes. As pointed out, for higher direct current output voltages we may provide additional tubes, arranged in a variety of ways, and we have found that in the majority of cases such a modified direct current supply set will suffice for maintaining a current through the fault.

The provision of the low tension test circuit in the direct current supply set, operating on the voltage-drop principle, makes this circuit capable of use with the same supply source as that used for the loop, because of the constant voltage-drop characteristics of the mercury vapor tube rectifiers. Other features, such as the particular arrangements of the contacts and connections in the equipment so that all of the high tension leads are positioned away from the operator, the disposition of the switches for facilitating changing from one circuit to another, and the compact arrangement of the parts which reduces the size of the equipment and increases its portability, together with a particular type of support which we have provided for the mercury vapor tubes, which permits their transportation and their use in a portable device of this type without injury to the tube, together with a particular type of high tension terminal which we have provided for the direct current supply set, will be described in detail in connection with the following description, which, together with the accompanying drawings, will disclose to those skilled in the art the particular construction and operation of a preferred form of our invention.

In the drawings:

Figure 4 is a diagrammatic circuit for the low tension testing equipment and the direct current supply set;

Figure 5 is a modified diagrammatic circuit for the low tension testing equipment and direct current supply set;

Figure 6 is a detail view of the thermionic tube mounting;

Figure 7 is a detail view of a high tension terminal;

Figure 8 is a modified diagrammatic circuit illustrating one manner of increasing the voltage output of the direct current supply set;

Figure 9 is a second modified diagrammatic circuit illustrating another method of increasing the voltage output of the direct current supply set;

Figure 10 is a circuit diagram showing the switching connections for changing from the circuit shown in Figure 8 to that shown in Figure 9;

Figure 11 is a diagrammatic view of the application of an embodiment of the invention to a switch station; and Figure 12 is a diagrammatic view, similar to Figure 11, of a second modified application of the invention to a switch station.

Figure 1:
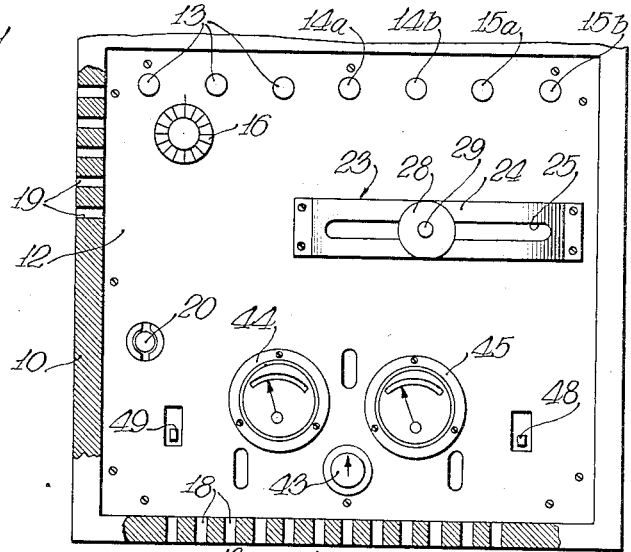
Figure 1 is a plan view of the housing and apparatus comprising the low tension testing circuit and the direct current supply set.
Figure 2:
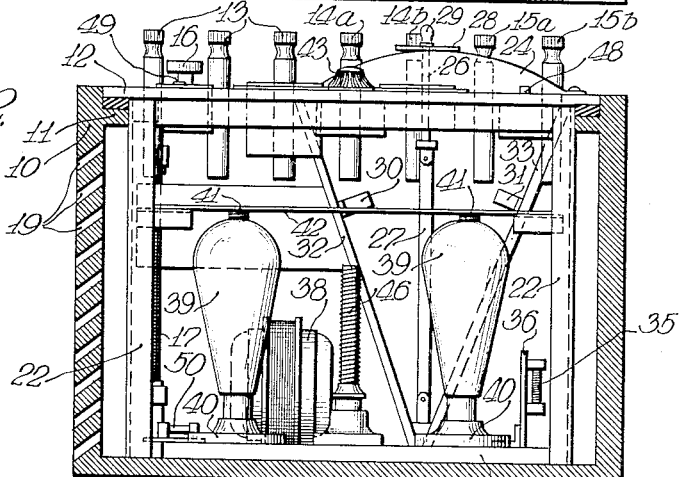
Figure 2 is a sectional elevational view of the same.
Figure 3:
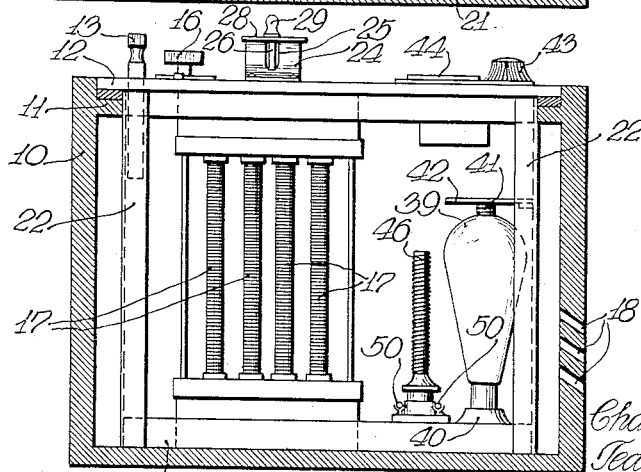
Figure 3 is an end sectional elevational view.

Referring now in detail to Figures 1 to 3, inclusive, which disclose the direct current supply set and low tension testing circuit apparatus for use in the testing of the faulted conductor, this apparatus is mounted within a suitable box indicated by the numeral 10, this box having an inner projecting portion 11 surfaced with rubber or similar cushioning material for supporting the panel 12 upon which the apparatus is mounted. This box 10 is also provided with a cover (not shown) which is secured thereto by means of suitable locking means, and a suitable handle or strap or other similar device for the purpose of facilitating its transportation in field use is provided on the case. Charts and calculation tables may be carried within the cover.

The panel is provided with a plurality of binding posts disposed along the rear side thereof, and because of their position the operator is less likely to come into contact with the connecting supply and output leads, the binding posts 13 comprising the terminals for the alternating current input to the direct current supply, and the terminals 14a and 14b comprising the binding posts for leading out the direct current which has been rectified from the alternating current input. The terminals 15a and 15b are for connection when it is desired to use the low tension testing circuit.

In Figure 7 we have disclosed a modified form of high tension terminal for use in the embodiment of this invention, which is capable of being used for high voltages. This terminal comprises the threaded insulated body portion 63, extending through and secured to the panel 12. The body portion 63 receives a central connecting member 64, which has its outer end threaded to receive the terminal nut 65 for securing a connecting lead. The lower portion of the stem or connecting member 64 is adapted to be engaged by the conductor 66 which leads from the terminal to the switch point 41. This conductor may be threaded to the stem, soldered thereto, or secured in any suitable manner. A cylindrical insulated sleeve 67 is threaded onto the shank of the body portion 63, and extends downwardly past the connection between the stem and conductor. The provision of this sleeve is optional, since the shank may be extended downwardly a sufficient distance beneath the panel 12 to effect the same result.

Referring back to the disclosure of Figures 1 to 3, disposed adjacent the high voltage alternating current input terminals 13 is a switch 16, which is adapted to control a plurality of tubular resistances 17. These resistances 17 are suitably supported at one side of the equipment, and are adapted to be air-cooled as by means of the holes 18 drilled into the side of the box 10 at the front thereof, and disposed at the lower portion of the front of the box as indicated in Figure 3. These holes 18 permit air to be drawn into the interior of the box past the rectifying tubes and around the tubular resistances 17 to the holes 19 drilled in one side wall of the box. Convection currents, caused by the heating of the rectifying tubes and by the heating of the resistances, are sufficient to cause movement of air past the tubes and the resistances and out through the openings 19. It will be noted that the openings 18 are drilled in such a manner as to slant away from the interior of the box, so as to direct the air current upwardly over the surface of the rectifying tubes and out past the resistance and also to keep rain out of the box when in use in the field.

A suitable receptacle 20 is provided for connection to any low source of alternating current, such as a 115 volt source from an ordinary lighting circuit, and is employed at all times to heat the filament circuit of the rectifying tube. This alternating current input through the plate winding of the transformer is also for the purpose of supplying direct current to the low tension testing circuit or for low voltage measurements with the loop, whereas the high tension alternating current lead into the terminals 13 is rectified to direct current for the purpose of maintaining current through the fault while the loop measurements are being made, or for other miscellaneous testings.

The entire structure, including the panel 12, the base panel 21, and the supporting frame members 22, is adapted to form a rigid construction which is cushioned upon the resilient surface of the projection 11 of the box.

A three-pole switch is provided for the purpose of shifting from the low alternating current input through plug 20 and transformer 38, to the high tension alternating current input to the terminals 13. This switch is indicated in its entirety by the reference numeral 23. It comprises an arched panel supporting plate 24 secured to the panel 12, and which is provided with a centrally located opening 25 adapted to receive the operating stem 26 of the switch member 27. The top of the stem 26 is provided with a circular insulating disc member 28, upon which the operating knob 29 is mounted. The arched metal plate 24, together with the disc 28 and the insulating knob 29, is adapted to prevent arc from creeping up the switch 27 and the stem 26 and coming into contact with the operator, which might be dangerous in cases where the voltages used are relatively high, or when operating in wet weather.

The switch contacts are indicated at 30 and 31, and mounted upon the blade members 32 and 33 for receiving the corresponding parts of the switch member 27. The switch contacts 30 are adapted to be engaged when the low voltage supply is to be used, and the switch members or contacts 31 are adapted to be engaged when the high tension supply circuit is to be used.

The center tap of the high tension alternating current input is connected to the limiting resistance switch 16 and through there to the resistances 17 which thereby control the current input.

A wire wound fixed resistance 35 is provided for the purpose of providing a constant load at 110 volts direct current output. This is used in connection with the low tension testing circuit or the low voltage supply for the loop, and is mounted upon a subpanel 36 which also carries suitable direct current output fuses (not shown) for protecting this circuit.

In connection with the low tension testing circuit and source of low voltage supply, a combination filament and plate transformer is provided, as indicated at 38, and is connected into the circuit of the mercury vapor rectifying tubes 39. These tubes 39 are mounted in suitable sockets 40, and are provided at their upper surfaces with springs 41 which are engaged by a suitable cross frame member 42 for the purpose of holding the tube securely, but resiliently, in position. A suitable filament rheostat 43, which in this particular embodiment of the invention comprises a 20 ampere, .19 ohm rheostat, is provided for the purpose of controlling the heating circuit supply current to the mercury vapor rectifying tubes 39. An alternating current volt meter 44 is provided across this heating circuit, for the purpose of indicating the voltage across the filaments of the tubes 39.

Considering now in detail Figure 6, it will be noted that the tubes 39 have their upper tips securely gripped by the springs 41. One end of each of the springs 41 is provided with a button portion 41', the other end of the spring being secured to the insulating frame member 42. By pushing on the portion 41' of the spring, the coils thereof are enlarged sufficiently to fit over the tip 39' of each of the tubes, and when the button is released, these coils grip the tip 39' in a firm engagement, thus providing a secure and positive positioning of the tube, while the coils of the spring between the upper end of the tip and the frame member 42 assure a resilient mounting.

In using the low tension testing circuit, a direct current second volt meter 45 is provided, which may be connected in parallel with a wire wound resistance 46, which preferably is of the order of 300 ohms for this particular embodiment. A single pole, single throw snap switch 48, preferably of special design, is provided for cutting the resistance into and out of the circuit.

A second double pole single throw snap switch 49 is provided for the purpose of controlling the low tension alternating current led into the plug member 20, and suitable fuses 50, in this embodiment of the order of 1 to 2 amperes, are provided for protecting this circuit.

If desired, an auxiliary resistance 61, shown in Figure 4, may be provided for the purpose of maintaining a constant load at high voltages, and may be regulated by means of a tap switch or the like, but we find that this has not been necessary in the operation of the equipment.

Considering now the apparatus disclosed in Figures 1 to 3, inclusive, in connection with the circuit diagram shown in Figure 4, we have indicated corresponding parts of the apparatus by the same reference numerals. Various modifications may be made in the low tension testing circuit and the direct current supply set without departing from the scope of the present invention. For instance, all the fuses could be omitted except those in the input leads from the low and high tension alternating current input. The primary of the filament plate transformer 38 could be tapped at suitable points so that the set may be used for other than a 115 volt supply, and the size of the core might be increased for using the set on a 25 cycle or other frequency of supply current. Also, the voltage capacity of the direct current supply set may be increased as by adding several more or increasing the size of the mercury vapor rectifying tubes and correspondingly changing the transformer, as will be described in detail in connection with Figures 8 and 9, although we have found that for practically all purposes the capacity of a low or medium direct current voltage is sufficient. Further, a small transformer might be utilized for the plate voltage supply for high tension use which could be made an integral part of the set. In increasing the voltage capacity of the direct current supply set, the number of resistances is correspondingly increased and the capacity of these could also be increased, if desired. Also, a direct current volt meter can be installed across the output terminals 14a and 14b of the direct current supply set. It is to be understood that all such changes or modifications come within the scope of the present disclosure.

Considering now in detail the rectifier circuit, the input current is introduced from a suitable source of alternating current supply through the plug member 20, and, by closing the snap switch 49, this current is passed to the combination filament (cathode) and plate (anode) transformer 38. The switch 27 has previously been moved into engagement with the contact 30, and the center contact thereof, indicated by the numeral 51, is directly connected with the conductor 52 leading through the fuse 53 to one of the low tension output terminals 14a and 15a. The other two contacts are connected with the conductors 54 and 55, leading from the plate transformer 38, and lead through the conductors 56 and 57 to the plates of mercury vapor rectifying tubes 39. The filaments of the tubes 39 are heated by means of the circuit connected with the rheostat 43, and a suitable volt meter 44 is connected across these lines to determine the voltage input to the filaments of the tubes.

The center tap of the secondary of the transformer 38 is connected through the conductor 58 and the fuse 53' to the terminal 14b and to a suitable point 59 leading to the volt meter 45 and, when the switch 48 is closed, through the parallel fixed resistance 46 to the other of the low tension output terminals 15b. The fixed stabilizing resistance 35 allows a constant current to pass from the center contact 51 of the secondary into the center contact 59 of the heating circuit. This resistance is preferably of the value of 6000 ohms, and thus provides a constant load, in this embodiment of approximately 18 milliamperes, at the direct current output voltage of 110 volts which is used for the low tension testing circuit or the loop circuit. The terminal 15b is connected to the faulted conductor, in the use of this equipment for analyzing and localizing cable faults, and the terminal 15a is connected to ground, although this is optional, and the resistance of the fault can then be determined from the reading on the volt meter 45. Similar tests between various conductors are also made. From this resistance, it is possible to determine the magnitude of the voltage required to maintain a current through the fault for Murray loop location. By grounding the line at the far end and repeating the tests, the continuity of the conductors may generally be determined.

A jumper is then placed across the far end of the faulted conductor and a clear or less faulted conductor, and the continuity of the loop conductors may then be checked by the low tension testing set and is positively determined by the Wheatstone bridge arrangement described in detail in our copending application.

With reference to the low tension testing circuit, as incorporated in the rectifier circuit or direct current supply set, this circuit comprises the input connections 59 and 14a, which may or may not be connected to the rectifier circuit, since any other direct current supply could be used. The faulted conductor is then preferably connected to terminal 15a, and terminal 15b is connected to ground, ordinarily the sheath of the cable, although these connections may be reversed. For fault resistances of small value as compared to the resistance of the volt meter 45, the switch 118 is closed to parallel the resistance 46 into the circuit.

Because of the voltage-drop characteristics, the input voltage divides between the resistance of the fault and the resistance of the volt meter, or the resistance of the volt meter and the parallel resistance 46, and the volt meter readings are then inversely proportional to the resistance of the fault. For example, assuming the resistance 46 to be of the order of 300 ohms, and the resistance of the fault to be about 600 ohms, the volt meter will read only one-third of the voltage input. As the resistance of the fault increases the volt meter readings decrease, and when the lowermost portion of the volt meter scale is reached, where readings are inaccurate, the switch 118 is opened, and the readings immediately are placed at the other end of the volt meter scale, due to the effective increase in resistance to the volt meter. By this means it is possible to always maintain the volt meter readings within that portion of the scale where readings may be accurately made, because of the parallel resistance and the voltage-drop characteristics of the circuit.

The resistance of the fault and the continuity of the conductors having been determined by means of the low tension testing circuit and the application of the Wheatstone bridge circuit, respectively, as described in our copending application, the next step in the location of the fault is to provide, by means of the direct current supply circuit, a sufficiently high direct current voltage to maintain a satisfactory current through the fault. (In this embodiment of the invention about 15 milliamperes or more.) This direct voltage may be supplied by either the direct current supply set, or, where the resistance of the fault is such that the voltage necessary to maintain a current therefrom is greater than the capacity of the supply set, other means may be used, such as a 30 kv. Kenatron portable outfit or any other suitable portable or permanently installed direct current supply, up to the limiting insulating value of the line or set.

With the terminal 14b grounded, terminal 14a of the direct current supply set is used as a supply, and in this embodiment is connected to the terminal of the Murray loop circuit. This keeps the filaments of the tubes at ground potential. The other terminal 14b leading from the direct current supply set is grounded as previously described.

The alternating current high voltage input, if necessary, is led into the direct current supply set through the terminals 13, the circuit being protected by suitable fuses indicated at 60. The center tap of this supply is led to the switch 16, which controls the tubular resistances 17. From the terminals 13, the current is led to the contact 31 of the three pole switch, and the switch member 27 is moved into contact therewith.

The center contact of the switch is connected by means of the conductor 52 through fuse 53 with the negative terminals of the direct output terminal 14a. The side contacts of the switch 27 are connected with the alternating current supply conductors leading thereto through the switch contacts 31, and the current is carried, by means of the conductors 56 and 57, to the plates of the mercury vapor rectifying tubes 39. The filaments of these tubes are heated by means of the filament winding of the transformer 38, and the current admitted to the filament is controlled by means of the secondary rheostat or resistance 43, the indication of the voltage passing through these filaments being shown by the volt meter 44. The conductor at the center of the secondary of the transformer, indicated by the numeral 58, leads through the fuse 53' to the positive side of the direct current output terminal 14b.

If desired, a suitable tapped resistance 61 may be provided for the purpose of maintaining a constant load at high voltages, and corresponds generally to the fixed resistance 35 used for the same purpose in the low tension testing circuit. However, we have found that this resistance does not seem to be necessary in the practice of the invention.

Considering now the simplified direct current supply and testing circuit disclosed in Figure 5, we have eliminated the center switch contact 51 shown in Figure 4. In this circuit, the conductor 70 leads directly from the current limiting resistance 17 to one of the high tension terminals 14'. The switch 27' is now only a double throw switch, and contacts respectively with the switch contacts 100 and 101.

The fixed resistance 35, which provides a constant load at the low tension voltage, is positioned as shown in Figure 4, between the mid points of the two transformer coils. When it is desired to use high tension direct current voltages for maintaining a current through the fault, the switch 27' is engaged with the contacts 101, and one of the terminals 14' or 72, preferably the latter, is grounded, the ungrounded terminal being connected to the direct current input terminal of the bridge and loop circuits used with this equipment.

However, when it is desired to use the direct current supply set at low voltages with the loop or for low tension testing purposes, the switch 27' is engaged with the contacts 100, and the low tension alternating current is led in from the plug 20 through the switch 49. In this embodiment, it will be noted that the primary of the transformer 38 is tapped intermediate its ends and a second plug 20' is provided for connection to the low tension alternating current supply when it is desired to use other than standard voltages. The switch 49', corresponding to the switch 49 of Figure 4, is likewise, transposed to the position shown in Figure 5. This circuit is similar to that described in connection with Figure 4, the low tension terminals being the terminal 72, and the terminal 74, the terminal 74 being connected to the transformer coil through the conductor 58'. When only the volt meter reading is desired, or for making a low tension test for the measurement of the resistance of the fault with an outside source of direct current, the terminals 73 and 74 are used in a manner similar to that described in connection with Figure 4. The terminals 72 and 73 are used for supplying low voltage direct current to the loop circuit, and terminals 14' and 72 are used for the medium voltage supply.

This simplified circuit thus provides four sets of terminals, the terminals 14' and 72 being used for high tension direct current output, the terminals 72 and 73 being used for low tension direct current output, the terminals 72 and 74 being used for low tension testing purposes, and the terminals 73 and 74 being used when it is desired to use the volt meter with an outside source of direct current. The operation of the remainder of the circuit is substantially the same as described in connection with Figure 4.

Referring now in detail to Figure 8, which is a partial modified circuit diagram showing one method of increasing the direct current output of the direct current supply set, we have provided a circuit herein which is capable of delivering approximately 6370 volts D. C., as compared to the 2000 volts D. C. provided by the circuit disclosed in Figures 4 and 5.

In the circuit disclosed in Figures 4 and 5, a fault of about 130,000 ohms can be satisfactorily located without reduction of the fault resistance. Faults however may run to a considerably higher resistance than this, in which case either additional D. C. supply equipment must be obtained or the fault must be reduced to a lower resistance, each of which may require considerable time. While we have heretofore described the use of auxiliary D. C. supply sets, nevertheless, it is possible to modify the circuit in the manner shown in Figure 8, in order to increase the voltage output of the set.

In the system proposed in Figure 8, which uses four mercury vapor rectifying tubes connected in a bridge circuit, this circuit will deliver approximately 6370 volts D. C. at .4 ampere with several 2300 volt transformers utilizing full wave rectification. This will also increase the utility of the set on higher voltage cables and will do away with the necessity of fault reduction in many cases.

In making this change, it is not necessary to change present dimensions of the set, although such a change might be advisable in order to make it more convenient to carry, but it is necessary to add the following equipment to that described in connection with Figures 1 to 5, inclusive. The current limiting resistances 17 are increased to approximately twelve in number, and two additional mercury vapor tubes, complete with the sockets, clips, rheostats and other auxiliary equipment are necessary. Also, the transformer 38, in the modified circuit shown in Figure 8, is removed and a small plate transformer capable of delivering about 142 volts and a special heating transformer with four heating windings, each insulated from the other and from the core for about 15,000 volts, is employed in the preferred modified form of the invention. Also, a circuit changing switch should be installed to change from the bridge circuit operation of the tubes, that is, full wave rectification to series operation of the tubes, that is, half wave rectification. Certain other changes in the equipment might be necessary, such as higher insulation, small changes as to the fuses, binding posts and the like.

In the diagram of the proposed modification, we have provided four mercury vapor rectifying tubes, indicated at 76, 77, 78, and 79 respectively, which correspond to the mercury vapor tubes 39 of Figures 2 and 3, and which are mounted in substantially the manner shown in Figure 6. The tubes have their heating circuits or filaments connected to the secondary windings of the heating transformer, indicated at 80, by means of the leads 86, 87, 88, and 89, respectively. The heating transformer 94 is shown as deriving its current from the 115 volt alternating current leads 83, the current being controlled by means of a suitable rheostat 43′, corresponding to the rheostat 43 shown in Figures 4 and 5. The outgoing leads are connected to suitable terminals indicated at 81 and 82, capable of delivering about 6300 volts direct current, the terminal 82 being connected through conductor 84 to the mid-points of the heating circuits 87 and 89, while the terminal 81 is connected through conductor 85 to the plate circuits of the tubes 76 and 78. The current for the plate circuits of the tubes 77 and 79 is derived through conductors 90 and 91, which are connected to the secondary winding 92 of the plate transformer 93, which also receives its current from the 115 volt conducting leads 83. Conductor 95 is taken off of conductor 90 leading from one end of the secondary winding 92, and is connected to the mid-point of the heating circuit 88 for the tube 78. Conductor 96 taken also from conductor 91 leading from the opposite end of the secondary winding 92 is connected to the mid-point of the heating circuit 86 of the tube 76. In this manner, the tubes are connected for parallel operation, and give full wave rectification capable of producing about 6300 volts D. C. across the terminals 81 and 82. This will allow an increase in the resistance of the fault to be located without necessitating the reduction of the resistance of the fault. With a direct current voltage supply of about 6370 volts a fault of about 420,000 ohms could be satisfactorily located without reduction of fault resistance.

Considering now the circuit disclosed in Figure 9, which is a proposed system using four mercury vapor rectifying tubes connected in series, this circuit will deliver approximately 13,000 volts direct current at .2 ampere with a number of 2300 volt transformers connected in series. This is accomplished with half-wave rectification.

In this circuit, the leads 83 are connected to a source of 115 volt single-phase alternating current, which is led in through the leads 83 to a heating transformer 94 having the four heating windings indicated at 80′, the current being controlled by means of the rheostat 43′. The leads also bring in current to the two primary windings of a pair of plate transformers 93a and 93b connected in series. The secondary windings of the plate transformers 93a and 93b are indicated at 92a and 92b, respectively. From the inner end of the secondary winding 92a the conductor 84′ leads to the terminal 82′, corresponding to the terminal 82 of Figure 8. The outer end of the secondary winding 92 of the transformer leads through conductor 96′ to one of the heating windings in the heating transformer 94. Each of the tubes 76′, 77′, 78′, and 79′ is provided with a corresponding heating circuit for the respective filaments of the tubes, indicated at 86′, 87′, 88′, and 89′, which are connected to the four heating windings indicated at 80′ for the heating transformer 94. From the mid-point of the heating winding for the heating circuit 86′, the conductor 91′ is connected to the plate circuit of the tube 77′. From the mid-point of the heating winding in the circuit 87′, the conductor 95′ leads to the plate circuit of the tube 78′. From the mid-point of the heating winding in the heating circuit 88′, the conductor 90′ leads to the plate circuit of the tube 79′. The plate circuit of the tube 76′ is connected through conductor 85′ to the terminal 81′, corresponding to terminal 81 of Figure 8. The heating winding in the heating circuit 89′ is connected through conductor 96′ to the secondary winding 92b of transformer 93b. The voltage obtained across the terminals 81′ and 82′ in this circuit is about 13,000 volts direct current, which is capable of satisfactorily locating a fault of about 850,000 ohms without the reduction of the fault resistance.

It is obvious that the two circuits might be employed within the same direct current supply set, with several 2200 or 4400 volt external transformers provided, using no center tap in the circuit, as shown in Figure 5. Thus, when the circuit is set for series operation the direct current supply set will pass about 13,000 volts direct current with three 4400 volt external transformers in series.

In Figure 10 we have shown, somewhat diagrammatically, one form of switching arrangement which might be employed for effecting a change from the circuit shown in Figure 8 to that shown in Figure 9.

In this figure, the main transformer coils are indicated at 101. The terminals for the filament exciter circuit are indicated at 102, leading to the coil 103 of the exciter. We have shown four mercury vapor rectifying tubes, (in the present embodiment being General Electric type P. J. 28A) indicated at 105, having the customary plate or anode 106, and the customary filament or cathode 107 connected to the main transformer coils 101. Three switches, indicated at 108, 109, and 110, are provided for the series-parallel switching for the tubes. When it is desired to connect these tubes in series, all of the switches 108 to 110 are up. The left hand end tube 105 is then connected, through conductor 111, to the positive side of the line, indicated by the terminal 112. One of the switch points from each of the switches 110, 109, and 108, is connected through the conductor 113 to the negative terminal 114 of the line. When switches 108 and 110 are down, and switch 109 is up, the tubes are connected in a series-parallel arrangement, as will be apparent from the drawings. When all of the switches are down, the tubes are connected in parallel.

It is to be understood, of course, that variations in the switching arrangement for these tubes may be made without departing from the scope of the present invention.

It is apparent, therefore, that by the interposition of the circuit shown in Figures 8 and 9 in the general circuit for the direct current supply set shown in Figures 4 and 5, we are enabled to increase the voltage output of the direct current supply set, without increasing the size of the set, and we are thus able to locate faults having a much greater resistance than is possible with the direct current supply set shown in Figures 1 to 5, inclusive. With the modified types of circuits, the scope of application of the testing device is increased, since the voltage produced in this manner is sufficient to take care of any continuous conductor failure on most power transmission systems, except in extremely rare types of cable faults. In many cases, it would reduce the necessity of fault reduction, thus saving a considerable amount of time ordinarily required in reducing the fault before the loop equipment can be applied.

The use of a direct current supply set capable of supplying direct current to a Murray loop circuit so that the use of such a circuit for analyzing and locating cable faults is practically universal, is the primary feature of the present invention, and it is believed that the application of such a set to either portable use in the field, or to a permanent installation in a distribution center or switch station, is broadly new.

In Figures 11 and 12, we have illustrated, diagrammatically, two methods of modifying the structure proposed in our invention, in order to apply the same to switch stations, sub-stations, distribution centers or switching centers.

Considering Figure 11, the reference numeral 118 indicates the direct current supply set described in detail hereinbefore, having the terminals 20' for connection to a standard 110 volt alternating current supply source, and having the terminals 13' for connection to high voltage alternating current supply sources from transformers or the like. The terminals indicated at 14' corresponds to the terminals 14a and 14b of Figures 1 and 2, and are the direct current outlet terminals leading from the direct current supply set 118 to a Murray loop testing set indicated diagrammatically at 120. This supply set 118 therefore supplies the direct current voltage necessary to operate the loop circuit shown diagrammatically at 120. The loop circuit 120 is connected through leads 121 to test busses 123 and 124, these busses having branch bus connections or bus conductors 125 and 126 connected thereto. Each of the busses preferably contain a plurality of conductors, to be selectively used in accordance with the particular conductors which are being used in the bay. The busses 123 and 124 run substantially parallel to a series of switch bays indicated generally at 127, and are provided with flexible leads 129 disposed adjacent each of the bays and connected by means of suitable clamps or the like, such as the clamp described in detail in our above-mentioned copending application, to the terminals of the conductors or cables leading from the switch station. The same type of leads 129 are provided upon the test busses 125 and 126. Clamp leads are advisable in such a structure, in order to eliminate the varying resistance which would be provided by a switch contact. However, switches having a constant contact resistance may be employed.

In the installation of such a testing set in a switch station or the like, three primary advantages are to be considered. First, a fixed direct current supply and loop circuit is provided at some central point, where it is permanently located, and thus can be calibrated accurately. Secondly, all calibrations of terminal lines leading from the switch station are made in advance, and may be reduced to linear feet of lengths of the cable in terms of the resistance thereof, and the lengths of the test busses from the loop to the different switch bays, and the resistance of the flexible conductors from the busses to the switch bays, are all calibrated in terms of the resistance of the cables or conductors to be tested. Thirdly, the switch connections are eliminated, and removable clamp connections are provided, which scratch or bite into the surface of the metal of the terminal, in order to produce a connection having a constant small resistance. By providing such an installation, we have found that accurate and positive determination and location of cable faults can be made.

In Figure 12, we have shown a modified type of installation for a switching sub-station, where there are a plurality of bays, and permanently installed apparatus is desirable. In this case, the leads from the direct current supply set and the loop circuits are conducted through the test busses 123, 124, 125, and 126 to centrally located junction boxes, indicated at 130 and 131, disposed in substantially central positions with respect to the individual bay divisions. From the junction boxes 130 and 131, suitable flexible leads, of a length sufficient to reach the farthermost bay in the particular bay division, and indicated at 129', are provided, which are capable of being connected to any of the bay divisions within a particular bay section. As set forth in connection with Figure 11, quick and accurate location of cable faults can be determined by this permanent installation within a sub-station, all that is necessary being the attachment of the flexible conductors or cable leads 129 to the particular bay section in which the cable fault has occurred.

We believe that the provision of such a testing and analyzing means for a sub-station, utilizing universal application of voltage for fault location, is broadly new, and produces an installation which reduces the time necessary to locate a fault as well as increasing the convenience and accuracy of the location determined. This is due to the fact that the instruments are all permanently set in position, and thus are subject to the niceties of laboratory adjustment and testing instead of open use out in the fields. Further, by the provision of the test busses and the flexible cable, having their resistance calculated in advance, as well as length, the calibrations of the nature required for this work can be made in advance, and consequently the readings can be made directly in terms of length along a faulted conductor.

These calculations can be charted so that the reading obtained after the loop circuit is balanced will indicate directly the particular location of the fault, such as by being tabulated to indicate nearest manhole location or the like.

We are aware that many changes and modifications can be made in the apparatus and circuits disclosed in the present invention, since we have provided only one preferred embodiment of the equipment, and we contemplate the use of other types of instruments and ranges of operation than those described in detail in connection with the illustrated embodiment of our invention, and do not intend to be limited except as defined by the spirit and scope of the appended claims.

We claim:
1. In a direct current supply set, a housing, an instrument panel disposed in and removable from said housing, a subpanel spaced from and carried by said instrument panel, cushioning means disposed in said housing and supporting said instrument panel, alternating current input terminals disposed on said instrument panel, direct current output terminals mounted on said panel, switching means extending through said instrument panel and carried by said subpanel, rectifying means connected between said alternating current terminals and said direct current terminals and carried by said subpanel, and a transformer disposed upon said subpanel.

2. In a direct current supply set, a portable housing having front and back portions, an instrument panel disposed in and removable from said housing, a subpanel spaced from and carried by said instrument panel, cushioning means disposed in said housing and supporting said instrument panel, alternating current input terminals for supplying high tension and low tension alternating current to said set disposed on said instrument panel, said high tension alternating current terminals being disposed adjacent the back portion of said housing, direct current output terminals mounted on said panel, switch means extending through said instrument panel and carried by said subpanel, rectifying means connected between said alternating current terminals and direct current terminals and carried by said subpanel adjacent the front portion of said housing, and a transformer disposed upon said subpanel.

3. In a direct current supply set, a portable housing of box-like form, cushioning means disposed in said housing, an instrument panel supported on said cushioning means, a subpanel rigidly spaced from said instrument panel, a plurality of resistances mounted on said subpanel, rectifying tubes mounted on said subpanel, said housing having openings drilled at an angle in adjacent side walls thereof for providing ventilation for said resistances and rectifying tubes, low tension alternating current terminals, a transformer supported on said subpanel and connected to said terminals, high tension alternating current terminals, a double-throw switch carried by said subpanel and projecting through said instrument panel, said switch being connected to said rectifying tubes, and direct current output terminals mounted on said instrument panel.

4. In a direct current supply circuit, a low tension alternating current source, a high tension alternating current source, a transformer, means for connecting said low tension current source to said transformer, a double-throw switch, a set of switch contacts connected to said transformer, a second set of switch contacts connected to said high tension current source, vapor tubes having their plate circuits connected to said switch, a variable resistance in said high tension current source for limiting the current flowing therethrough, a fixed resistance connected to provide a constant load during low tension operation, a pair of terminals for leading out direct current supply, means for controlling said voltage supply to provide any desired current up to the limiting output of said tubes while operating said circuit at any voltage within the maximum range of voltages of said tubes, and terminals for leading out low tension direct current for resistance or other testing.

5. In a direct current supply set, a plurality of mercury vapor rectifying tubes, a plurality of alternating current supply sources, means for selectively connecting said tubes to one of said sources of alternating current supply, a variable heating circuit for the cathodes of said tubes, terminals for leading out direct current from said set, conductors leading from said tubes to said terminals, and switching means for shifting said tubes from parallel connection to series connection.

6. In a direct current supply set including a housing, a plurality of mercury vapor rectifying tubes disposed therein, spring means for resiliently supporting said tubes in position, ventilating means for said tubes, a plurality of terminals for connecting said tubes to a source of alternating current supply, transformer means in said connection, means for connecting said tubes in series, switch means for shifting said tubes to parallel connection, and means for varying the current supplied to the filaments of the tubes.

7. A direct current supply set comprising a portable housing, upper and lower panels cushioned in said housing, a plurality of alternating current input connections on said upper panel, sockets on said lower panel, thermionic tubes disposed in said sockets, a transformer mounted on said lower panel and connected to the filaments of said tubes, means for connecting said transformer to certain of said alternating current input connections, resilient means for supporting the tip ends of said tubes, direct current output terminals on said upper panel, and means for connecting said tubes to said terminals.

CHARLES W. NEWHALL, Jr.
TED B. MORSE.